United States Patent [19]

Bleier et al.

[11] Patent Number: 5,301,067

[45] Date of Patent: Apr. 5, 1994

[54] HIGH ACCURACY PERISCOPE ASSEMBLY

[75] Inventors: Zvi Bleier, Comack; Morton S. Lipkins, Bayside, both of N.Y.

[73] Assignee: PLX Inc., Deer Park, N.Y.

[21] Appl. No.: 880,215

[22] Filed: May 6, 1992

[51] Int. Cl.$^5$ ............................................. G02B 23/08
[52] U.S. Cl. ................................... 359/857; 359/629; 359/871; 156/64
[58] Field of Search ............... 359/402, 629, 857, 871, 359/900; 156/64

[56] References Cited

U.S. PATENT DOCUMENTS

| | | | |
|---|---|---|---|
| 1,733,869 | 10/1929 | Edwards . | |
| 2,635,506 | 4/1953 | Chaimson | 359/857 |
| 3,014,408 | 12/1961 | Miller, Jr. . | |
| 3,601,343 | 8/1971 | Sivaslian | 248/2 |
| 4,110,011 | 8/1978 | Tausch | 350/301 |
| 4,277,141 | 7/1981 | Kleiber | 350/299 |
| 4,496,416 | 1/1985 | Machler et al. | 156/64 |
| 4,750,826 | 6/1988 | Maan | 350/631 |
| 4,943,127 | 7/1990 | McRight | 350/6.8 |
| 4,975,573 | 12/1990 | Girard | 250/252.1 |
| 5,024,514 | 6/1991 | Bleier et al. | 350/618 |

Primary Examiner—John J. Vrablik
Attorney, Agent, or Firm—Gottlieb, Rackman & Reisman

[57] ABSTRACT

A high accuracy periscope assembly is provided. The high accuracy periscope assembly of the invention is comprised of a hollow tubular member and two mirror panels. The tubular member has slanting surfaces at ends thereof and openings to allow light beams to enter, pass through and exit the tubular member. The mirror panels have reflective surfaces for reflecting the light beams and mounting pads for adhering the mirror panels to the tubular member. Alignment pads are also provided which have contact pads and a reinforcement member. The reflective surfaces of the mirror panels are aligned and then the alignment pads secure the mirror panels in their aligned positions without disrupting the kinematic mounting of the structure.

53 Claims, 3 Drawing Sheets

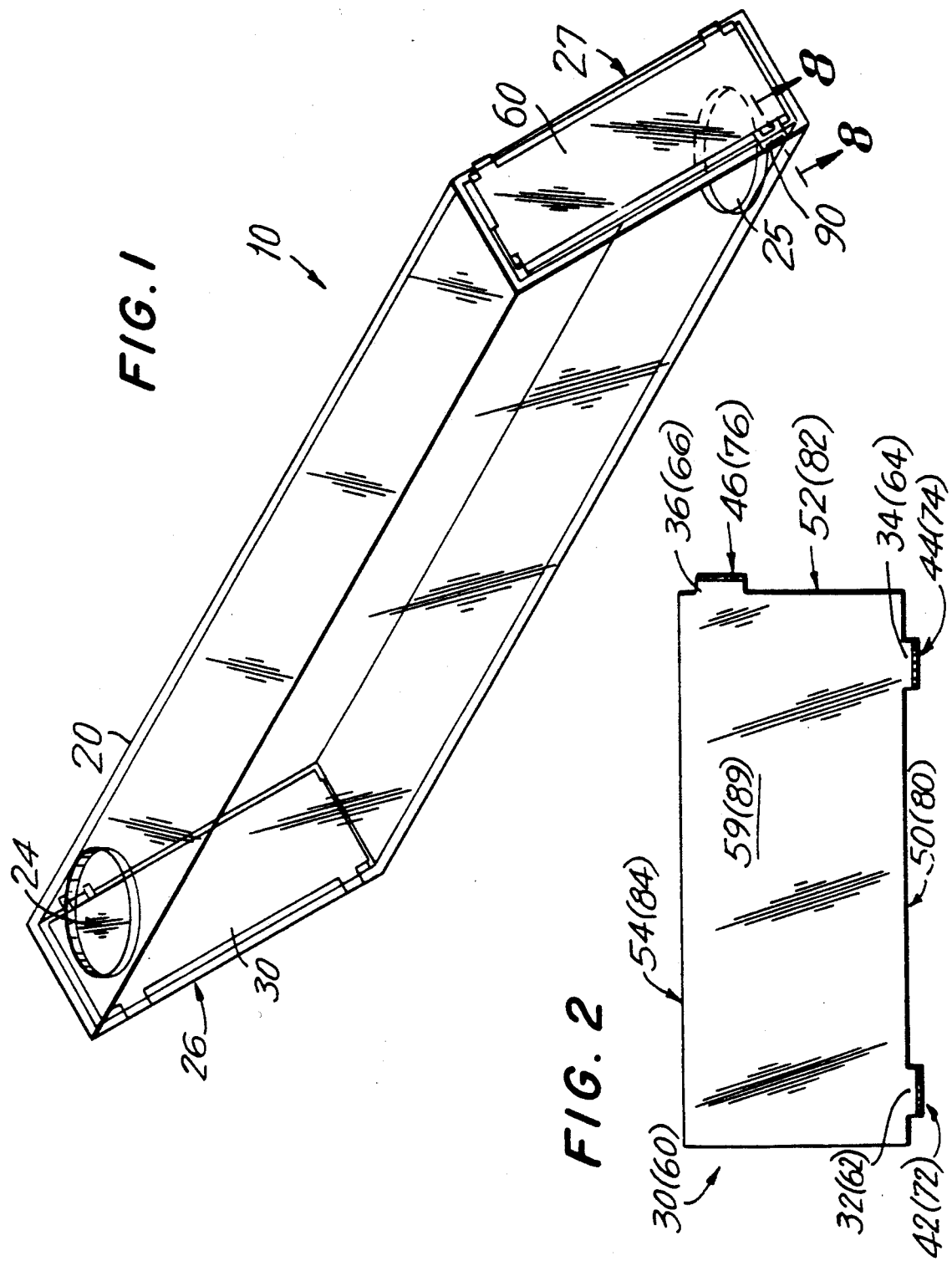

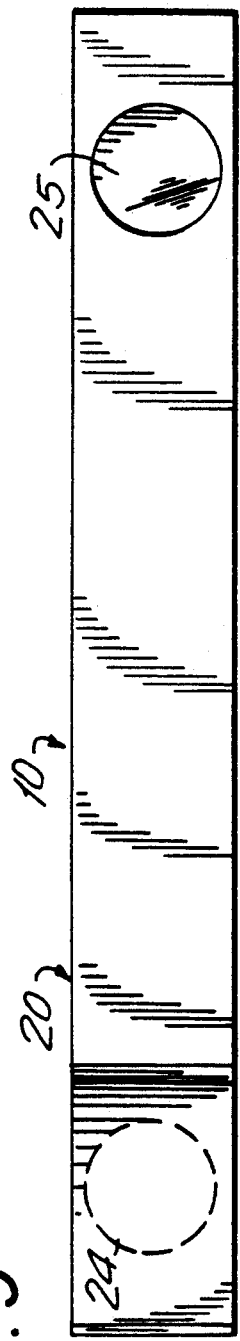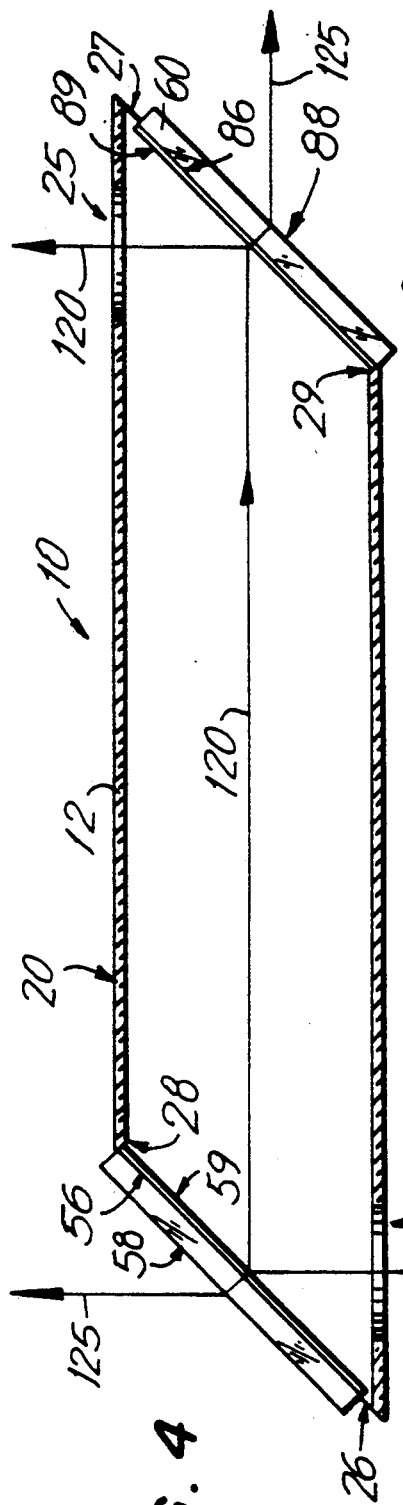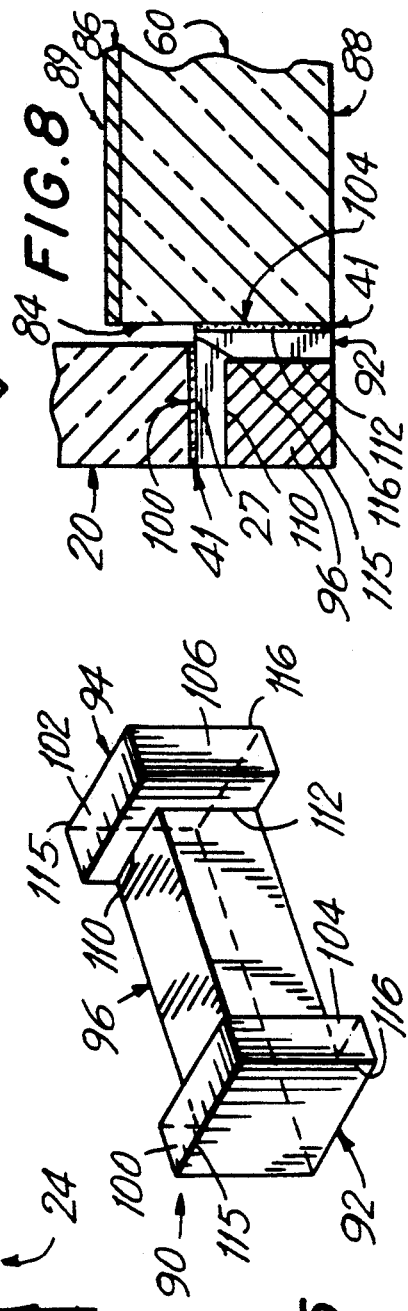

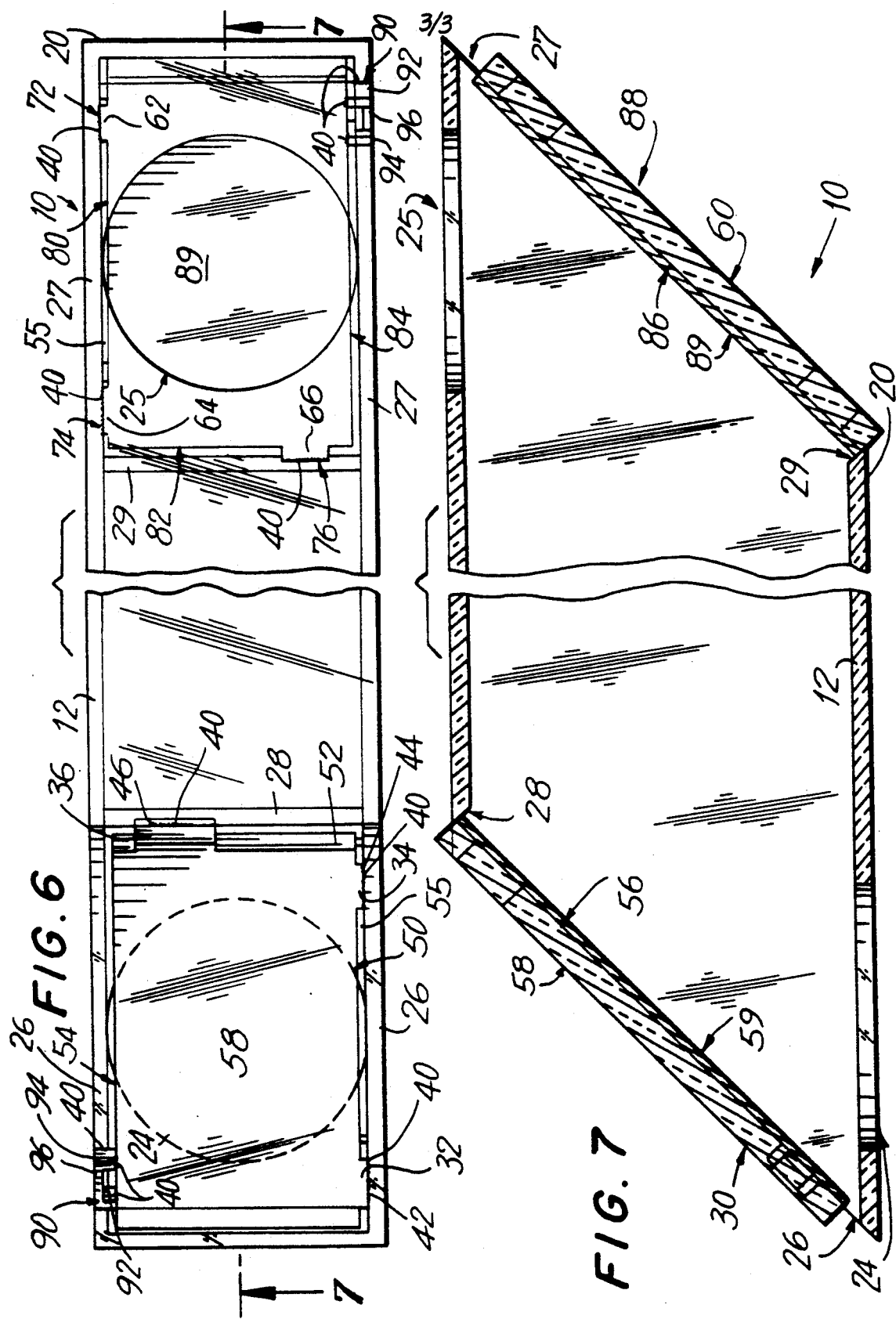

5,301,067

HIGH ACCURACY PERISCOPE ASSEMBLY

BACKGROUND OF THE INVENTION

This invention relates to the field of periscopes, and more particularly, to a high accuracy periscope assembly and a method of constructing a high accuracy periscope assembly.

Periscopes are old in the art and normally consist of some sort of cylindrical or tubular central chamber into which are placed two spaced apart reflecting surfaces. The reflecting surfaces face each other so that a person looking into an opening at one end of the cylindrical member will see the image which is reflected off of the more remotely situated reflecting surface; since this image will be visible through a second opening in the cylindrical member near the second reflecting surface.

Periscopes can also be used to reflect light beams having a certain direction upon entering the periscope, so that the light beams exit the periscope having substantially the same direction, or some other desired direction, but displaced linearly a distance equivalent to the separation distance of the reflecting surfaces. Depending upon the accuracy needed for the periscope, the alignment of the reflecting surfaces can be varied.

Accordingly, the accuracy of a periscope assembly is determined by the alignment between a light beam entering the periscope and the same light beam exiting the periscope. The more accurately aligned the entering and exiting light beams are, the higher the accuracy of the periscope.

Methods which have been previously used to achieve high accuracy, or guidance, of light beams are seen in the following United States patents.

U.S. Pat. No. 5,024,514 to Bleier et al. is directed to a Lateral Transfer Retroreflector and a Roof Mirror for Same. As seen in the figures, the retroreflector of the '514 patent has a mirror panel 110 and a roof mirror 10 which are offset a distance corresponding to the length of tubular member 130. A retroreflector is a device for redirecting a light beam along a path which is offset from the entering light beam and which is in a direction opposite to the incoming light beam.

Specifically, the '514 patent is directed to a lateral transfer retroreflector, wherein mirror panel 110 and roof mirror 10 are adhered to tubular member 130 through the use of three mounting pads located on each of mirror panel 110 and roof mirror 10. However, the structure of the '514 patent does not allow (1) the direction of the exiting light beam to be substantially the same as that for the entering light beam and (2) for exacting alignment of the reflective surfaces of mirror panel 110 and roof mirror 10, as is presented in the present invention U.S. Pat. No. 4,975,573 to Girard for an Optical Test Bench shows another previously used method of aligning light beams. As shown in FIGS. 5-18, and specifically, FIGS. 9 and 12, a laser alignment periscope system 192 (FIG. 9) permits exact adjustment of the relative inclination of parabolic mirrors 112 and 114 via adjusting bolts and nuts 182-188 (FIG. 12). The method of achieving the adjustment of the relative inclination of mirrors 112 and 114 is most clearly illustrated in FIGS. 15-18. The distinctive quality of the '573 patent with respect to the present invention, is that the '573 patent does not achieve its high accuracy through adjustment of periscope system 192, but through adjustment of bolts 182-188 which secure mirrors 112 and 114 to mounting plate 116. Accordingly, it is not periscope 192 of the '573 patent which achieves the high precision.

U.S. Pat. No. 4,933,127 to McRight for a Multi-Faceted Optical Device for a Laser Scanner, shows, in FIG. 3, mirrors 110 adhere to three raised pads 112 located on mirror receiving faces 108. Pads 112 define three planes of contact upon which mirrors 110 are adhered to receiving faces 108. However, no method of achieving final exacting alignment of the mirrors is shown, and therefore, the invention of the '127 patent is distinguishable from the present invention.

Finally, U.S. Pat. No. 4,277,141 for a Multi-Faceted Mirror and Assembly Fixture and Method of Making such Mirror shows another method which is old in the art for achieving the accurate alignment of reflecting surfaces As seen in FIG. 1, mirrors 15 are bonded to support or core element 11 by epoxy 14. To attach mirrors 15 to support 11, mirrors 15 are held in accurate positions that are independent of faces 16 of support 11 and epoxy 14 is injected between faces 16 and mirrors 15 to form a secure bond. There is, however, no method of adjusting the accuracy of mirrors 15 after epoxy 14 is cured.

Accordingly, it would be desirable to provide a high accuracy periscope assembly in which the direction of an exiting light beam is substantially the same as the direction for an entering light beam and which achieves its accuracy through a kinematic mounting system consisting of mounting pads to adhere the reflecting surfaces to the tubular member and a fourth alignment pad for finally aligning the reflecting surfaces and securing the reflecting surfaces to the tubular member in their aligned positions.

SUMMARY OF THE INVENTION

In accordance with the invention, an improved high accuracy periscope assembly is provided. The periscope of the invention is comprised of a tubular member and two mirror panels.

The tubular member is constructed of a material having dimensions which are relatively stable with respect to temperature, such as fused quartz or annealed pyrex. The tubular member has first and second slanting surfaces at first and second ends thereof. The slanting surfaces may be parallel to each other. Mirror panels having a reflective surface are mounted at the first and second ends of the tubular member, at the first and second slanting surfaces, so that the reflective surfaces of the mirror panels can occupy parallel planes. The tubular member also has openings so that light beams may pass into and through the tubular member to be reflected against the reflective surfaces of the mirror panels.

Preferably, the tubular member has a rectangular cross-section. Each of the first and second slanting surfaces of the tubular member located at the first and second ends of the tubular member has third and fourth slanting surfaces which can be parallel to each other and perpendicular to the first and second slanting surfaces.

The mirror panels are rectangular members, preferably having three mounting pads for engaging inner surfaces of the tubular member and the third and fourth slanting surfaces, respectively.

First and second mounting pads extend from a first side of the mirror panels and contact an inner surface of the tubular member. Third mounting pads extend from a second side of the mirror panels, which side is perpendicular to and intersects the first side of the mirror panels. The third mounting pad of one mirror panel contacts the third slanting surface of the tubular member, while the third mounting pad of the other mirror panel contacts the fourth slanting surface of the tubular member.

When the first and second mounting pads of the mirror panels contact the inner surface of the tubular member, a recess is defined between the first side of the mirror panel and the inner surface of the tubular member. An adhesive is disposed between first and second mounting surfaces of the first and second mounting pads and the first inner surface of the tubular member, and between third mounting surfaces of the third mounting pads and the third and fourth slanting surfaces of the tubular member The mirror panels are then adhered to the tubular member, and because of the three point mounting system, a kinematic structure is established.

Also in accordance with the invention, an alignment pad comprising first and second contact pads and a reinforcement member is used to align the reflective surfaces of the mirror panels. Each of the first and second contact pads has first and second contact surfaces which are adhered to the tubular member and the mirror panel, respectively. The reinforcement member is disposed between the two contact pads and is preferably square in cross-section. The sides of the contact pads are longer than any of the cross-sectional sides of the reinforcement member so that the sides of the reinforcement member do not abut either the tubular member or the mirror panel.

The first contact surfaces of the first and second contact pads are adhered to the tubular member along the first or second slanting surfaces, depending upon which mirror panel the alignment pad is attached to. The second contact surface of each of the contact pads of the alignment pad is adhered to a third side of the particular mirror panel. The third side of the mirror panel is parallel to the first side of the mirror panel and is perpendicular to and intersects the second side of the mirror panel. The adherence of the alignment pads does not affect the kinematic structure created by the three-point mounting of the mirror pads.

Accordingly, it is an object of the invention to provide an improved high accuracy periscope.

Still another object of the invention is to provide a high accuracy periscope having a tubular member and first and second mirror panels.

Still a further object of the invention is to provide a high accuracy periscope wherein the mirror panels are kinematically mounted to the tubular member, while an alignment pad is secured between the mirror panel and the tubular member without affecting the kinematic mounting of the mirror panels to the tubular member.

Other objects of the invention will in part be obvious and will in part be apparent from the following description.

The invention accordingly comprises n assembly possessing the features, properties and the relation of components which will be exemplified in the products hereinafter described and the method of constructing the products hereinafter described, and the scope of the invention will be indicated in the claims.

BRIEF DESCRIPTION OF THE DRAWINGS

For a fuller understanding of the invention, reference is made to the following description taken in connection with the accompanying drawings, in which:

FIG. 1 is a perspective view of a high accuracy periscope assembly in accordance with the invention;

FIG. 2 is a plan view of a mirror panel made in accordance with the invention;

FIG. 3 is a plan view of a tubular member of the high accuracy periscope assembly according to the invention;

FIG. 4 is a side elevational view of the high accuracy periscope assembly according to the invention;

FIG. 5 is a perspective view of an alignment pad made in accordance with the invention;

FIG. 6 is a plan view of an assembled high accuracy periscope assembly according to the invention;

FIG. 7 is a cross-sectional view taken along line 7—7 of FIG. 6; and

FIG. 8 is a cross-sectional view taken along line 8—8 of FIG. 1.

DETAILED DESCRIPTION OF THE PREFERRED EMBODIMENT

Referring to FIG. 1, a high accuracy periscope assembly made in accordance with the invention and generally designated at 10 is illustrated. High accuracy periscope 10 includes a tubular member 20, a first mirror panel 30, a second mirror panel 60, alignment pads 90 and first and second openings 24 and 25 in tubular member 20.

Tubular member 20, as best shown in FIGS. 1, 3 and 4, is formed with relatively thin walls having a thickness 12 and is made from fused quartz or fine annealed pyrex. Tubular member 20 is generally of a rectangular cross-section. A first end of tubular member 20 terminates with a first slanting surface 26, while a second end of tubular member 20 terminates with a second slanting surface 27. First slanting surface 26 and second slanting surface 27 can be parallel. However, there is no requirement that the sides be parallel, as will be discussed below.

Tubular member 20 also has third slanting surface 28 at its first end and fourth slanting surface 29 at its second end. Third and fourth slanting surfaces 28 and 29 are parallel to each other and perpendicular to first and second slanting surfaces 26 and 27, if first and second slanting surfaces 26 and 27 are parallel.

Tubular member 20 also has first opening 24 and second opening 25 located in proximity to first mirror panel 30 and second mirror panel 60, respectively Openings 24 and 25 allow light beams 120 to enter, propagate through and exit tubular member 20, as shown in FIG. 4.

Referring to FIGS. 2 and 7, first and second mirror panels 30 and 60 are shown. Mirror panels 30 and 60 may be formed of an optically transmissive glass, are substantially rectangular in shape and have top planar surfaces 56 and 86 and bottom planar surfaces 58 and 88, respectively. Mirror panels 30 and 60 each have a reflective surface 59 and 89, respectively, over top planar surfaces 56 and 86.

Reflective surfaces 59 and 89 may be an ordinary "silver" coating or may be a beam splitter coating. As shown in FIG. 4, if top planar surface 56 and bottom planar surface 58 of first mirror panel 30 are both optically flat and parallel to one another, and if reflective surface 59 is a beam splitter coating, then some of the light from light beam 120 which passes through first opening 24 and strikes reflective surface 59 of first mirror panel 30 will pass through reflective surface 59, through first mirror panel 30 and will emerge from bottom planar surface 58 to travel in a direction parallel to the direction at which light beam 120 entered tubular member 20 through opening 24, as shown at 125. Depending upon the nature of reflective surface 59, light beam 125 may be of a particular frequency range, while any remaining light of light beam 120 not of that particular frequency is reflected from first mirror panel 30 through tubular member 20 to second mirror panel 60. Reflective surface 89 of second mirror panel 60 may also be a beam splitter coating, so that the same procedure as just described for first mirror panel 30 takes place and a light beam 125 emerges from bottom planar surface 88 of second mirror panel 60, as shown in FIG. 4.

Continuing with FIG. 2, a mirror panel made in accordance with the invention is shown. The mirror panel of FIG. 2 has been labelled to correspond to both first mirror panel 30 and second mirror panel 60; the reference numerals shown without parentheticals refer to the structure of first mirror panel 30, while the reference numerals within the parentheticals refer to the structure of second mirror panel 60 (see FIG. 7). For simplicity of review, an identical system will be used to describe the mirror panel of FIG. 2 within this specification Mirror panel 30(60) has a first mounting pad 32(62), a second mounting pad 34(64) and a third mounting pad 36(66). Each mounting pad has a mounting surface; first mounting surface 42(72) for first mounting pad 32(62), second mounting surface 44(74) for second mounting pad 34(64) and third mounting surface 46(76) for third mounting pad 36(66).

The three mounting pads of mirror panel 30(60) extend from two different sides of mirror panel 30(60). First and second mounting pads 32(62) and 34(64) extend from a first side 50(80), while third mounting pad 36(66) extends from a second side 52(82) of mirror panel 30(60). First side 50(80) of mirror panel 30(60) is perpendicular to second side 52(82). Accordingly, while first mounting surface 42(72) and second mounting surface 44(74) are co-planar to each other, they are perpendicular to third mounting surface 46(76). As will be discussed in greater detail below, mirror panel 30(60) has a third side 54(84) onto which alignment pad 90(90) is adhered.

Finally, with respect to FIG. 2, and as has been previously discussed, mirror panel 30(60) has a reflective surface 59(89) on top planar surface 56(86) for reflecting light beams 120.

Turning now to FIGS. 5 and 8, alignment pad 90 is shown. In its preferred condition, alignment pad 90 is a separate, unitarily formed piece of periscope 10 which is adhered to first and second mirror panels 30 and 60 and to tubular member 20 to accurately align, and maintain alignment of, top planar surfaces 56 and 86, and therefore, reflective surfaces 59 and 89.

Alignment pad 90, as shown in FIG. 5, comprises first contact pad 92, second contact pad 94 and reinforcement member 96. Reinforcement member 96 is disposed between contact pads 92 and 94, while alignment pad 90 is preferably formed of one piece; without the need of joining contact pads 92 and 94 to reinforcement member 96. However, alignment pad 90 may also be constructed of three separate pieces, 92, 94 and 96.

Continuing with FIGS. 5 and 8, each of first and second contact pads 92 and 94 have first contact surfaces 100 and 102, and second contact surfaces 104 and 106, respectively. First contact surfaces 100 and 102 are adhered to tubular member 20 on first and second slanting surfaces 26 and 27, respectively. Second contact surfaces 104 and 106 are adhered to third sides 54 and 84 of mirror panels 30 and 60, respectively, as is best shown in FIG. 8.

As shown in FIG. 8 with respect to the second end of tubular member 20 and second mirror panel 60, first contact surfaces 100 and 102 and second contact surfaces 104 and 106 of one alignment pad 90 are adhered at the same time to both second slanting surface 27 of tubular member 20 and to third side 84 of second mirror panel 60, respectively Similarly, but not specifically shown, first contact surfaces 100 and 102 and second contact surfaces 104 and 106 of another alignment pad 90 are adhered at the same time to both first slanting surface 26 of tubular member 20 and to third side 54 of first mirror panel 30, respectively.

The bonding of alignment pads 90 to tubular member 20 and mirror panels 30 and 60 is achieved through use of an adhesive material 40. Adhesive material 40 can be any one of several well-known cements which provide adequate strength and performance over a required temperature range.

Considering specifically the method of bonding alignment pads 90 to tubular member 20 and mirror panels 30 and 60, FIG. 8 will be more closely analyzed. As is shown in FIG. 8, and as is also shown in FIGS. 1 and 7, mirror panels 30 and 60 are not totally within tubular member 20, but extend partially outside of tubular member 20 at first and second slanting surfaces 26 and 27. In this fashion, alignment pads 90 can be adhered to the corner created between slanting surfaces 26 and 27 of tubular member 20 and third sides 54 and 84 of mirror panels 30 and 60, respectively.

As a final matter with respect to alignment pads 90, as shown in FIG. 8, reinforcement member 96 has a cross-sectional area which is square, having cross-sectional sides 110 and 112. First contact surfaces 100 and 102, and second contact surfaces 104 and 106 have lengths which are defined by edges 115 and 116. As shown in FIGS. 5 and 8, cross-sectional sides 110 and 112 of reinforcement member 96 are smaller than edges 115 and 116 of contact pads 92 and 94. In this way, sides 110 and 112 of reinforcement member 96 do not abut tubular member 20 or third sides 54 or 84 of mirror panels 30 or 60, as best shown in FIG. 8.

The method of assembling high accuracy periscope 10 of the present invention is as follows.

To assemble a high accuracy periscope assembly 10 in accordance with the present invention, it is first necessary to construct a tubular member of fused quartz or fine annealed pyrex having first slanting surface 26, second slanting surface 27, third slanting surface 28 and fourth slanting surface 29, along with first and second openings 24 and 25.

Additionally, identical mirror panels 30 and 60 should be constructed in which both the top planar surfaces 56 and 86 and the bottom planar surfaces 58 and 88 are optically flat and made of an optically transmissive glass. Top planar surfaces 56 and 86 of mirror panels 30 and 60 will need to have a reflective surface 59 and 89.

Each of mirror panels 30 and 60 should preferably have three mounting pads (32, 34 and 36) and (62, 44 and 66), respectively, which are formed with mirror panels 30 and 60, so that they do not have to be later connected to mirror panels 30 and 60, although such a system could be used. Each of these mounting pads has a planar mounting surface (42, 44 and 46) and (72, 74 and 76), respectively, as has been previously described.

In a less preferred, although also usable embodiment, each of mirror panels 30 and 60 may have a fourth mounting pad (not shown) which would be positioned in the location that alignment pads 90, to be discussed below, will be situated. However, since the mounting of mirror panels 30 and 60 onto tubular member 20 is designed to be kinematic in nature, such an additional mounting pad would remove the structure from achieving kinematic mounting. Accordingly, four mounting pads, as opposed to three mounting pads and one alignment pad (discussed below), is a less desirable configuration for mirror panels 30 and 60.

Finally, to assemble periscope 10, two alignment pads 90 must be created. Alignment pads 90, as have been previously described, are preferably unitary pieces, constructed without the need of attaching contact pads 92 and 94 to reinforcement member 96.

Once all pieces of periscope 10 have been assembled, the procedure of assembling periscope 10 is generally as follows: (1) mirror panels 30 and 60 are adhered to first and second ends of tubular member 20, respectively; (2) light beams 120 are sent through first opening 24 and are reflected off of reflective surfaces 59 and 89 and then out second opening 25; (3) pressure is exerted, at a position where alignment pads 90 will be installed, to bottom surfaces 58 and 88 of mirror panels 30 and 60 until alignment of entering and exiting light beams 120 has been achieved; (4) an alignment pad 90 is adhered to third side 54 of first mirror panel 30 and first slanting surface 26 of tubular member 20; (5) a second light beam 120 is sent through tubular member 20; (6) pressure is exerted against bottom surface 88 of second mirror panel 60 at the point where another alignment pad 90 will be adhered, until such time as exiting light beam 120 is properly aligned with entering light beam 120; and (7) another alignment pad 90 is adhered to third side 84 of second mirror panel 60 and second slanting surface 27 of tubular member 20.

A more detailed review of the above steps reveals that an adhesive 40 is applied to first, second and third mounting surfaces 42(72), 44(74) and 46(76) of first and second mirror panels 30(60). First and second mounting surfaces 42 and 44 of first mirror panel 30 are adhered to an inner surface of tubular member 20 (see FIG. 6), while third mounting surface 46 is adhered to third slanting surface 28 of tubular member 20. Similarly, first and second mounting surfaces 72 and 74 of second mirror panel 60 are adhered to another inner surface of tubular member 20, while third mounting surface 76 is adhered to fourth slanting surface 29 of tubular member 20.

Once adhering material 40 has cured and mirror panels 30 and 60 are bonded to tubular member 20, light beam 120 enters first opening 24 and reflects off of reflective surface 59, propagates through tubular member 20, reflects off of reflective surface 89 and exits through second opening 25. After mirror panels 30 and 60 have been aligned, an alignment pad 90 is bonded to first slanting surface 26 of tubular member 20 and to third side 54 of first mirror panel 30 by the use of adhesive material 40, to secure first mirror panel 30 in its aligned position.

Alignment pad 90 is preferably a separate piece in order to maintain the kinematic structure and mounting of mirror panel 30 to tubular member 20. Due to its being a separate piece, alignment pad 90 will not exert forces onto mirror panel 30 which would upset the kinematic mounting. Instead, alignment pad 90 merely becomes part of the existing kinematic structure without adversely affecting it.

Light beams 120 are again sent through tubular member 20 and the same method used to align first mirror panel 30 is used to align second mirror panel 60. Once another alignment pad 90 has been adhered to third side 84 of second mirror panel 60 and to second slanting surface 27 of tubular member 20, periscope 10 is complete.

This high accuracy periscope 10 and the method of assembling high accuracy periscope 10 can achieve a significant reduction in the degree of error between the parallelism of entering light beam 120 and exiting light beam 120, if such parallelism is desired, or it can achieve a high degree of precision in the direction of exiting light beam 120, even if parallelism is not desired Prior art periscopes have only been able to at best achieve three seconds (3") of arc of error in the parallelism between entering and exiting light beams 120. However, periscope 10, made in accordance with the present invention has reduced the error between the parallelism of entering and exiting light beams 120 to within one-half second (½") of arc. With this mounting structure, a higher degree of accuracy may also be achieved in the desired directional positioning of light beam 120, i.e., even when parallelism is not required.

It will thus be seen that the objects set forth above, among those made apparent from the preceding description, are efficiently attained and, since certain changes may be made in the above constructions and methods of construction without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A high accuracy periscope assembly, comprising:
a tubular member having first and third slanting surfaces at a first end thereof, second and fourth slanting surfaces at a second end thereof, a first opening at said first end and a second opening at said second end;
first and second mirror panels having reflective surfaces;
first and second mounting means, said first means for mounting said first mirror panel at said first end of said tubular member to said tubular member and said third slanting surface, and said second means for mounting said second mirror panel at said second end of said tubular member to said tubular member and said fourth slanting surface;
wherein light beams entering said tubular member through said first opening and corresponding light beams exiting said tubular member through said second opening propagate in substantially the same direction.

2. A high accuracy periscope assembly as recited in claim 1, wherein said tubular member is hollow.

3. A high accuracy periscope assembly as recited in claim 1, wherein said third slanting surface is substantially perpendicular to said first slanting surface.

4. A high accuracy periscope assembly as recited in claim 1, wherein said fourth slanting surface is substantially perpendicular to said second slanting surface and substantially parallel to said third slanting surface.

5. A high accuracy periscope assembly as recited in claim 1, wherein said tubular member is hollow.

6. A high accuracy periscope assembly as recited in claim 1, wherein said third slanting surface is substantially perpendicular to said first slanting surface.

7. A high accuracy periscope assembly as recited in claim 1, wherein said fourth slanting surface is substantially perpendicular to said second slanting surface and substantially parallel to said third slanting surface.

8. A high accuracy periscope assembly as recited in claim 1, wherein said mounting of said first mirror panel to said tubular member and said third slanting surface is to an inner surface of said tubular member and to said third slanting surface, and said mounting of said second mirror panel to said tubular member and said fourth slanting surface is to another inner surface of said tubular member and to said fourth slanting surface.

9. A high accuracy periscope assembly as recited in claim 1, wherein said first and second mounting means comprise mounting pads.

10. A high accuracy periscope assembly as recited in claim 9, wherein said mounting pads for mounting said first and second mirror panels comprise a first, a second and a third mounting pad.

11. A high accuracy periscope assembly as recited in claim 10, further comprising means for aligning said first and second mirror panels at said first and second ends of said tubular member.

12. A high accuracy periscope assembly as recited in claim 11, wherein said alignment means comprises first and second alignment pads for said first and second mirror panels.

13. A high accuracy periscope assembly as recited in claim 12, wherein each of said first and second alignment pads comprises a first contact pad, a second contact pad and a reinforcement member.

14. A high accuracy periscope assembly as recited in claim 13, wherein said reinforcement member of each of said alignment pads is disposed between said first and second contact pads.

15. A high accuracy periscope assembly as recited in claim 13, wherein each of said contact pads has a first contact surface for mounting said alignment pad to said mirror panel and a second contact surface for mounting said alignment pad to a second inner surface of said tubular member.

16. A high accuracy periscope assembly as recited in claim 15, wherein said first contact surface of each of said contact pads of said first mirror panel contacts said first slanting surface, and said first contact surface of each of said contact pads of said second mirror panel contacts said second slanting surface.

17. A high accuracy periscope assembly as recited in claim 15, herein each of said reinforcement members is substantially square in cross-section, having intersecting side surfaces, wherein none of said side surfaces abut against either said mirror panel or said tubular member.

18. A high accuracy periscope assembly as recited in claim 17, said first and second mounting pads extend from a first side of said mirror panel, said first and second mounting pads having first and second mounting surfaces for mounting said mirror panel to said tubular member.

19. A high accuracy periscope assembly as recited in claim 18, wherein said first and second mounting surfaces of said first and second mounting pads are co-planar.

20. A high accuracy periscope assembly as recited in claim 19, wherein when said mirror panel is mounted to said tubular member at said first and second mounting pads, a recess is defined between said tubular member and said first side of said mirror panel.

21. A high accuracy periscope assembly as recited in claim 19, wherein each of said third mounting pads of said mirror panels extends from a second side of said mirror panel, said second side of said mirror panel being substantially perpendicular to and intersecting said first side of said mirror panel.

22. A high accuracy, periscope assembly as recited in claim 21, wherein each of said third mounting pads of said mirror panels has a third mounting surface which is substantially perpendicular to said co-planar mounting surfaces of said first and second mounting pads.

23. A high accuracy periscope assembly as recited in claim 22, each of said contact pads of said alignment pads is mounted to a third side of said mirror panel, said third side being substantially parallel to said first side and substantially perpendicular to said second side of said mirror panel.

24. A high accuracy periscope assembly as recited in claim 23, wherein said mounting of said mounting surfaces and said mounting of said contact surfaces comprises adhering said mounting surfaces to said tubular member and said contact surfaces to said mirror panel and said tubular member.

25. A high accuracy periscope assembly as recited in claim 1, further comprising means for aligning said firs and second mirror panels at said first and second ends of said tubular member.

26. A high accuracy periscope assembly as recited in claim 25, wherein said first and second mounting means comprise mounting pads.

27. A high accuracy periscope assembly as recited in claim 26, wherein said mounting pads of each of said first and second mirror panels comprise a first, a second and a third mounting pad.

28. A high accuracy periscope assembly as recited in claim 27, wherein said alignment means comprises first and second alignment pads for said first and second mirror panels.

29. A high accuracy periscope assembly as recited in claim 28, wherein said first and second mounting pads extend from a first side of said mirror panel, said first and second mounting pads having first and second mounting surfaces for mounting said mirror panel to said tubular member.

30. A high accuracy periscope assembly as recited in claim 29, wherein said first and second mounting surfaces of said first and second mounting pads are co-planar.

31. A high accuracy periscope assembly as recited in claim 30, wherein when said mirror panel is mounted to said tubular member at said first and second mounting pads, a recess is defined between said tubular member and said first side of said mirror panel.

32. A high accuracy periscope assembly as recited in claim 30, wherein said third mounting pad extends from a second side of said mirror panel, said second side of said mirror panel being substantially perpendicular to and intersecting said first side of said mirror panel.

33. A high accuracy periscope assembly as recited in claim 32, wherein each of said third mounting pads of said mirror panels has a third mounting surface which is substantially perpendicular to said co-planar mounting surfaces of said first and second mounting pads.

34. A high accuracy periscope assembly as recited in claim 33, wherein said alignment pad of each of said mirror panels extends from a third side of said mirror panel, said third side being substantially parallel to said first side and substantially perpendicular to said second side of said mirror panel.

35. A high accuracy periscope assembly as recited in claim 34, said alignment pad has an alignment surface for mounting said alignment pad to said tubular member.

36. A high accuracy periscope assembly as recited in claim 35, wherein said mounting of said first, second and third mounting surfaces and said mounting of said alignment surface comprises adhering said mounting surfaces to said tubular member and said alignment surface to and said tubular member.

37. A high accuracy periscope assembly as recited in claim 35, wherein said alignment surface of said alignment pad is mounted to an inner surface of said tubular member.

38. A high accuracy periscope assembly as recited in claim 1, wherein said tubular member is formed of material having dimensional stability with respect to changes in temperature.

39. A high accuracy periscope assembly as recited in claim 38, wherein said material is one of fused quartz or annealed pyrex.

40. A high accuracy periscope assembly as recited in claim 1, wherein said mirror panels are formed of a light transmissive material, and said reflective, surfaces are beam splitter coatings.

41. A high accuracy periscope assembly as recited in claim 40, wherein said mirror panels have a bottom surface substantially parallel to said reflective surfaces, whereby a portion of said light beam striking said reflective surfaces travels through said reflective surfaces and said mirror panels and then continues substantially parallel to the direction of said light beam striking said mirror panels.

42. A method of assembling a high accuracy periscope assembly, comprising the steps of:
forming a tubular member having first and third slanting surfaces at a first end thereof, second and fourth slanting surfaces at a second end thereof, a first opening at said first end and a second opening at said second end;
forming first and second mirror panels having reflective surfaces; and
mounting said first mirror panel at said first end of said tubular member to said tubular member and said third slanting surface and said second mirror panel at said second end of said tubular member to said tubular member and said fourth slanting surface so that light beams entering said tubular member through said first opening and corresponding light beams exiting such tubular member through said second opening propagate in substantially the same direction.

43. A method of assembling a high accuracy periscope assembly as recited in claim 42, further comprising:
forming first and second alignment pads;
aligning said reflective surfaces of said first and second mirror panels;
mounting said first alignment pad to said first mirror panel and said tubular member;
re-aligning said reflective surface of said second mirror panel with said aligned reflective surface of said first mirror panel; and
mounting said second alignment pad to said second mirror panel and said tubular member.

44. A method of assembling a high accuracy periscope assembly as recited in claim 43, wherein said aligning step further comprises the steps of:
directing a light beam towards said tubular member so that said light beam enters said tubular member through said first opening in said tubular member, reflects off of said reflective surface of said first mirror panel, travels through said tubular member and exits said tubular member through said second opening in said tubular member after reflecting off of said reflective surface of said second mirror panel; and
exerting pressure on said mirror panels until said entering and exiting light beams are aligned.

45. A method of assembling a high accuracy periscope assembly as recited in claim 44, wherein said re-aligning step further comprises the steps of:
directing a light beam toward said tubular member so that said light beam enters said tubular member through said first opening in said tubular member, reflects off of said reflective surface of said first mirror panel, travels through said tubular member and exits said tubular member through said second opening in said tubular member after reflecting off of said reflective surface of said second mirror panel; and
exerting pressure on said second mirror panel until said entering and exiting light beams are aligned.

46. A method of assembling a high accuracy periscope assembly as recited in claim 42, wherein said first and second mirror panels also have mounting pads for mounting said first and second mirror panels and alignment pads for aligning said first and second mirror panels, wherein said mounting step further comprises mounting said first mirror panel to said tubular member and said third slanting surface and said second mirror panel to said tubular member and said fourth slanting surface by said mounting pads.

47. A method of assembling a high accuracy periscope assembly as recited in claim 46, further comprising the steps of:
aligning said reflective surfaces of said first and second mirror panels;
mounting said alignment pad of said first mirror panel to said tubular member;
re-aligning said reflective surface of said second mirror panel with said aligned reflective surface of said first mirror panel; and
mounting said alignment pad of said second mirror panel to said tubular member.

48. A method of assembling a high accuracy periscope assembly as recited in claim 47, wherein said aligning step further comprises the steps of:
directing a light beam towards said tubular member so that said light beam enters said tubular member through said first opening in said tubular member, reflects off of said reflective surface of said first mirror panel, travels through said tubular member and exits said tubular member through said second opening in said tubular member after reflecting off of said reflective surface of said second mirror panel; and exerting pressure on said mirror panels until said entering and exiting light beams are aligned.

49. A method of assembling a high accuracy periscope assembly as recited in claim 48, wherein said re-aligning step further comprises the steps of:

directing a light beam toward said tubular member so that said light beam enters said tubular member through said first opening in said tubular member, reflects off of said reflective surface of said first mirror panel, travels through said tubular member and exits said tubular member through said second opening in said tubular member after reflecting off of said reflective surface of said second mirror panel; and exerting pressure on said second mirror panel until said entering and exiting light beams are aligned.

50. A high accuracy periscope assembly assembled in accordance with the method of claim 42.

51. A high accuracy periscope assembly assembled in accordance with the method of claim 43.

52. A high accuracy periscope assembly assembled in accordance with the method of claim 46.

53. A high accuracy periscope assembly assembled in accordance with the method of claim 47.

* * * * *